US011725620B2

(12) United States Patent
Kloster et al.

(10) Patent No.: US 11,725,620 B2
(45) Date of Patent: Aug. 15, 2023

(54) UNDERWATER HYDROELECTRIC POWER GENERATION SYSTEM INCLUDING A PELTON TURBINE AND PERFORATED TUBULAR PENSTOCKS

(71) Applicant: Subsea 7 Norway AS, Stavanger (NO)

(72) Inventors: Ernst Kristen Helgoy Kloster, Stavanger (NO); Rasmus Asp Juhlin, Stavanger (NO)

(73) Assignee: Subsea 7 Norway AS, Stavanger (NO)

(*) Notice: Subject to any disclaimer, the term of this patent is extended or adjusted under 35 U.S.C. 154(b) by 69 days.

(21) Appl. No.: 17/288,198

(22) PCT Filed: Oct. 25, 2019

(86) PCT No.: PCT/EP2019/079293
§ 371 (c)(1),
(2) Date: Apr. 23, 2021

(87) PCT Pub. No.: WO2020/084150
PCT Pub. Date: Apr. 30, 2020

(65) Prior Publication Data
US 2021/0404433 A1    Dec. 30, 2021

(30) Foreign Application Priority Data

Oct. 26, 2018  (GB) .................................... 1817492
Oct. 29, 2018  (GB) .................................... 1817653

(51) Int. Cl.
*F03B 13/06*    (2006.01)
*F03B 13/10*    (2006.01)
*F03B 1/00*     (2006.01)

(52) U.S. Cl.
CPC ............... *F03B 13/06* (2013.01); *F03B 1/00* (2013.01); *F03B 13/10* (2013.01);
(Continued)

(58) Field of Classification Search
CPC .. F03B 1/00; F03B 13/06; F03B 13/10; F03B 2220/706; F03B 2230/60;
(Continued)

(56) References Cited

U.S. PATENT DOCUMENTS 4,321,475 A    3/1982  Grub
4,363,566 A   12/1982  Morton
(Continued)

FOREIGN PATENT DOCUMENTS

CA    2 467 287       11/2005
CN    107489586       12/2017
(Continued)

*Primary Examiner* — Tulsidas C Patel
*Assistant Examiner* — S. Mikailoff
(74) *Attorney, Agent, or Firm* — Levy & Grandinetti

(57) ABSTRACT

An underwater turbo-generator unit for producing electrical power has a pressure-resistant shell that defines a sealed internal chamber. At least one water inlet extends through the shell to effect fluid communication between the chamber and a body of water surrounding the shell. A turbine is supported within the chamber to turn on a spin axis in response to admission of a flow of water into the chamber via the or each water inlet. The shell is arranged to maintain a gas-filled space within the chamber, facilitating the use of a Pelton turbine that turns about a vertical spin axis. The or each water inlet communicates with at least one tubular penstock structure that can be supported by the unit outside the shell. The chamber communicates with, and drains water into, a fluid storage volume such as a pipeline positioned at a level beneath the chamber.

13 Claims, 12 Drawing Sheets

(52) U.S. Cl.
CPC ... *F05B 2230/60* (2013.01); *F05B 2240/2411* (2013.01); *F05B 2240/95* (2013.01); *F05B 2240/97* (2013.01)

(58) Field of Classification Search
CPC .......... F03B 2240/2411; F03B 2240/91; F03B 2240/95; F03B 2240/97; Y02E 10/20; Y02E 60/16
USPC ...................................................... 290/43, 54
See application file for complete search history.

(56) References Cited

U.S. PATENT DOCUMENTS

| | | | |
|---|---|---|---|
| 7,969,029 B2 | 6/2011 | Vitagliano | |
| 8,456,031 B1 | 6/2013 | Hull et al. | |
| 9,617,970 B2 | 4/2017 | Schmidt-Bocking | |
| 2009/0302613 A1* | 12/2009 | Ullman | F03B 13/22 290/54 |
| 2011/0215650 A1* | 9/2011 | Slocum | F03D 9/255 290/55 |
| 2012/0187692 A1* | 7/2012 | Walton | F03B 13/08 290/54 |
| 2012/0200089 A1 | 8/2012 | Deandrea et al. | |
| 2015/0198057 A1 | 7/2015 | Hanna | |
| 2015/0361948 A1 | 12/2015 | Schmidt-Boecking et al. | |
| 2020/0347815 A1 | 11/2020 | Kloster | |
| 2021/0404433 A1* | 12/2021 | Kloster | F03B 1/00 |
| 2021/0404434 A1* | 12/2021 | Kloster | F03B 13/06 |
| 2022/0025739 A1* | 1/2022 | Kloster | E21B 41/0085 |

FOREIGN PATENT DOCUMENTS

| | | |
|---|---|---|
| DE | 42 21 657 | 1/1994 |
| DE | 102012100981 | 8/2013 |
| DE | 102012011492 | 12/2013 |
| DE | 102016009990 | 2/2018 |
| EP | 2 420 668 | 2/2012 |
| EP | 2 683 933 | 9/2012 |
| FR | 3 002 597 | 8/2014 |
| GB | 2 032 009 | 4/1980 |
| GB | 2561196 | 10/2018 |
| WO | WO 2009/111861 | 9/2009 |
| WO | 2009/123465 | 10/2009 |
| WO | WO 2012/167783 | 12/2012 |
| WO | WO 2013/117329 | 8/2013 |
| WO | WO 2017/089814 | 6/2017 |
| WO | WO 2017/141027 | 8/2017 |
| WO | WO 2019/043105 | 3/2019 |

\* cited by examiner

UNDERWATER HYDROELECTRIC POWER GENERATION SYSTEM INCLUDING A PELTON TURBINE AND PERFORATED TUBULAR PENSTOCKS

This invention relates to the production of electrical power underwater on demand, in particular from an energy storage system at a subsea location such as the seabed.

When operating electrical power grids, it is a well-known challenge to match the supply of electricity to rapidly-fluctuating demand. Conversely, the use of intermittent power sources such as solar, wind and other renewables results in short-term fluctuations in generating capacity.

Even a transient mismatch between the supply and demand of electricity can cause an unacceptable variation in supply frequency across the grid. Consequently, it is routine to employ a mixture of generating assets with different attributes. Those assets typically comprise continuously-operating base-load sources, such as power stations powered by gas, coal or nuclear energy, and faster-reacting short-term sources, such as generators powered by gas turbines or diesel engines.

In addition, it is common for electrical power grids to employ load-balancing measures that involve temporary storage of energy. Energy may be stored in various ways, for example as electrochemical energy in batteries or as potential energy in water reservoirs, such as are used in pumped-storage hydroelectricity schemes. Other, less mature, energy-storage solutions include the use of flywheels or of compressed air. In each case, the stored energy can be released almost instantly to supply or to generate electricity on demand.

Elegantly, excess electricity from periods of low demand can be converted into electrochemical or potential energy to be saved for periods of higher demand. Typically this involves using the excess electricity to charge batteries or to pump fluids to higher heads or pressures. The fact that such an arrangement must be a net consumer of electrical energy is outweighed by benefits to the overall grid system, including more efficient use of base-load sources and minimising overcapacity of very expensive generating assets.

Energy is stored and discharged cyclically, most typically on a daily cycle reflecting different levels of demand for electricity during daytime and night-time periods. However to maintain control of the power grid, storage and discharge actions may be planned and executed on timescales ranging from days to seconds.

There is an increasing need for electrical power grids to be supplemented by short-term, quick-reacting energy storage systems. That need is driven by both supply-side and demand-side challenges. The main supply-side challenge is the increased reliance upon renewable energy sources, which can only provide a discontinuous or intermittent supply. A major demand-side challenge is how to recharge the rapidly-growing number of electrically-powered vehicles.

As a result, there is a need to find additional ways of storing very large amounts of energy that can be accessed quickly enough to generate electricity on demand. However, provision of sufficiently large battery installations and pumped-storage schemes would be extremely complex and expensive and raises significant environmental and planning concerns. Also, battery installations are prone to degrade with repeated charge/discharge cycles over a period of time.

Various subsea energy-storage solutions have been proposed. Examples are disclosed in WO 2009/123465, U.S. Pat. No. 4,321,475, EP 2683933, DE 102012011492, WO 2013/117329, WO 2009/111861, US 2015/361948, WO 2012/167783 and the Applicant's International Patent Application No. PCT/EP2018/073360.

U.S. Pat. No. 7,969,029 discloses a hydroelectric generator that is driven by pressurised air. A tubular structure that houses a turbine is anchored to the seabed. The lower end of the structure comprises an air injection system that releases pressurised air into the structure. The resulting mixture of air and water rising within the structure spins the turbine.

More generally, various proposals have been made for subsea power stations using turbines that spin in a flow of water, examples being the turbine assemblies disclosed in WO 2017/141027 and EP 2683933. However these and other prior art disclosures are not fully enabling; they merely illustrate the turbine assembly on a schematic or symbolic level and do not consider the practicalities of how to make such machines work efficiently in a subsea environment.

US 2009/0302613 describes an underwater power generation unit comprising turbines that are driven using a flow of water. US 2012/0200089 describes an underwater unit for a hydroelectric power plant. Additional examples of hydroelectric turbo-generator systems are described in US 2015/198057, CN 107489586, US 2011/215650 and FR 3002597.

The present invention proposes practical turbo-generator arrangements for use in subsea energy storage systems, such as the systems described in PCT/EP2018/073360. Those systems comprise a pressure-resistant vessel defining a fluid storage volume, exemplified by a pipeline, and a pump to evacuate seawater from the storage volume. Consequently, fluid remaining within the storage volume is at a pressure lower than the ambient pressure defined by the hydrostatic pressure of the surrounding seawater. Inward flow of seawater in response to that pressure differential spins a turbine that drives a generator to produce electric power.

Pelton turbines are well known in the field of hydroelectric power. They are characterised by a circumferential array of dished vanes that are shaped like shallow cups or buckets. Water flowing along a penstock from an upstream reservoir arrives at the turbine with high velocity. The high-velocity water is distributed between a circumferential array of tangentially-oriented injection nozzles that direct respective jets of pressurised water at the buckets of the turbine. The buckets reverse the flow of the jets to maximise the momentum change and hence the reaction force applied to the turbine.

The turbine is connected by a shaft to a co-axial alternator or generator to form a turbo-generator assembly. As the generator is heavy and bulky, small or freestanding hydroelectric installations are typically oriented such that the turbine and generator spin about a horizontal axis. A vertical axis is usually only adopted in very large hydroelectric installations such as dams, where massive structures of reinforced concrete can be built to support the generator atop the turbine or vice versa.

The skilled reader will appreciate that hydropower solutions that work on land or near the surface will not necessarily work deep underwater. For example, parts affected by seawater corrosion or by the growth of marine organisms cannot be maintained easily in seabed installations. Also, it is impractical to build massive supporting structures deep underwater.

A subsea energy storage system must define a sufficiently large storage volume for the required energy capacity and must withstand the hydrostatic pressure of deep water. Yet, the system must also be practical to construct and to install on the seabed, and must continue to work efficiently and reliably when installed. There is a need for subsea turbo-generator arrangements that are compatible with these objectives.

Against this background, the present invention resides in a turbo-generator assembly for producing electrical power underwater. In one expression of the inventive concept, the assembly comprises: a pressure-resistant shell that defines a sealed internal chamber and is arranged to maintain a gas-filled space within the chamber; at least one water inlet extending through the shell to effect fluid communication between the chamber and a body of water surrounding the shell; and a Pelton turbine supported within the chamber to turn in the gas-filled space on a spin axis in response to admission of a flow of water into the chamber via the or each water inlet.

The at least one water inlet preferably communicates with at least one tubular penstock structure. Thus, the inventive concept may also be expressed in terms of a turbo-generator assembly for producing electrical power underwater that comprises: a pressure-resistant shell that defines a sealed internal chamber; at least one water inlet extending through the shell to effect fluid communication between the chamber and a body of water surrounding the shell; a turbine supported within the chamber to turn on a spin axis in response to admission of a flow of water into the chamber via the or each water inlet; and at least one tubular penstock structure that is in fluid communication with the chamber via the or each water inlet. In this case, the turbine could be reversible to expel water from the chamber into the body of water that surrounds the shell.

The or each penstock structure preferably extends outside the shell to be exposed externally to the surrounding water, where it is conveniently supported by the shell or by another part of the assembly. The or each penstock structure suitably extends upwardly from the or each water inlet on an upright, preferably substantially vertical axis. The or each penstock structure may comprise a tapering accelerator portion disposed between an intake portion and the or each water inlet.

The chamber of the assembly may further contain a duct that communicates with the or each water inlet and with a circumferential array of nozzles that surrounds the turbine.

The shell may comprise a domed portion around the turbine. A generator may be supported by the shell. A transformer may also be supported by the shell or by another part of the assembly. The spin axis, which is preferably upright, and more preferably substantially vertical, suitably intersects the transformer.

The assembly may further comprise a drainage receptacle that communicates with the chamber to receive water falling from the turbine. The drainage receptacle suitably has an outlet for fluid communication with a fluid storage volume. The shell may be separably mountable and sealable to the drainage receptacle. Conveniently, the drainage receptacle may be attached to or integrated with an accessory module of a pipeline or with a towhead module of a pipeline bundle, where a pipeline or a bundle serves as a fluid storage volume communicating with the assembly.

The inventive concept extends to a power plant for producing electrical power underwater, the power plant comprising at least one turbo-generator assembly of the invention, whose internal chamber is in fluid communication with a fluid storage volume that is capable of holding fluid at a pressure substantially below hydrostatic pressure prevailing around the or each turbo-generator assembly. Preferably, the internal chamber of the or each turbo-generator assembly is positioned above the fluid storage volume and the shell of the or each turbo-generator assembly is exposed externally to surrounding seawater.

The power plant may further comprise at least one pump that is in fluid communication with the fluid storage volume and that is arranged to expel water from the fluid storage volume.

Where the fluid storage volume comprises a pipeline or a pipeline bundle, the or each turbo-generator assembly is suitably supported by a pipeline accessory module or by a bundle towhead module.

The inventive concept also embraces a method of installing a power station underwater. The installation method comprises: installing a fluid storage volume at an underwater location; subsequently, lowering a turbo-generator assembly to a position above the installed fluid storage volume; and with the turbo-generator assembly at said position, sealing the turbo-generator assembly to the fluid storage volume for fluid communication with the fluid storage volume. For example, the turbo-generator assembly may be placed on top of the installed fluid storage volume.

The fluid storage volume may be installed by installing a pipeline or pipeline bundle suspended from an installation vessel. Subsequently, the turbo-generator assembly may be attached to an accessory module of the pipeline or to a towhead module of the bundle.

The inventive concept also finds expression in methods of generating electrical power underwater. One such method comprises: drawing a flow of water under hydrostatic pressure into a sealed chamber at lower than hydrostatic pressure; forming one or more jets from the incoming flow of water; and impinging the or each jet of water against a Pelton turbine spinning in a gas in the chamber. Preferably, the incoming flow of water is accelerated along a penstock.

Preferably, the turbine is spun in the chamber about an upright axis while the gas is confined in the chamber, for example in an upper portion of the chamber around the turbine. Gas may be allowed to rise into the chamber from an underwater fluid storage volume that is in fluid communication with the chamber and is disposed at a level beneath the chamber.

Another method of generating electrical power underwater in accordance with the invention comprises: drawing a flow of water under hydrostatic pressure into a sealed chamber at lower than hydrostatic pressure; accelerating the incoming flow of water along a penstock; and impinging the accelerated flow of water against a turbine spinning in the chamber. The incoming water may be accelerated along the penstock outside the chamber.

Water may be drained from the turbine into an underwater fluid storage volume that is in fluid communication with the chamber and is disposed at a level beneath the chamber.

Embodiments of the invention provide a turbine structure for producing electrical power subsea. The structure comprises: a pressure-resistant body; a sealed chamber inside the body containing a gas such as air; at least one water inlet in fluid communication with seawater; and a Pelton turbine inside the chamber. The turbine preferably has a vertical spin axis to reduce fatigue and vibration due to asymmetry, and to ease installation and maintenance. The sealed chamber may be in fluid communication with a storage volume for gas or other fluid.

The turbine structure may comprise two or more inlets for seawater. The or each inlet may comprise a vertical or upright tube. The tube may have at least one bore and/or at least one filtering device. The inlets may be fluidly connected to at least one injection manifold, such as a ring around the turbine, comprising or communicating with at least one injection nozzle.

During a power production phase, seawater may be admitted into the injection manifold by a pressure difference between the interior of the body and the surrounding seawater. Waste water falling from the turbine after transferring its energy to the turbine may also be drained or evacuated to the gas storage volume by a pressure difference.

The body may comprise a base and an upper cover that can be brought together to define a sealed volume between them. The base may define a drainage receptacle for water falling from the turbine and may comprise an outlet leading to the gas storage volume. Conversely, the upper cover may comprise a shell and the at least one inlet. The upper cover may also enclose the turbine and support an alternator or generator block.

The upper cover of the body may be sealed to the base by one or more of the following releasable connections: a threaded connection; a dogleg lock; a collet connector system; and/or a pinbox connector system.

In summary, the invention provides a subsea turbo-generator unit for producing electrical power. The unit comprises a pressure-resistant shell that defines a sealed internal chamber. At least one water inlet extends through the shell to effect fluid communication between the chamber and a body of water surrounding the shell. A turbine is supported within the chamber to spin in response to admission of a flow of water into the chamber via the or each water inlet.

The shell may be arranged to maintain a gas-filled space within the chamber, facilitating the use of a Pelton turbine that may turn about a vertical spin axis. The or each water inlet may communicate with at least one tubular penstock structure that may be supported by the unit outside the shell. The chamber communicates with, and drains water into, a fluid storage volume such as a pipeline that may be positioned at a level beneath the chamber.

In order that the invention may be more readily understood, reference will now be made, by way of example, to the accompanying drawings in which.

Figure 11:
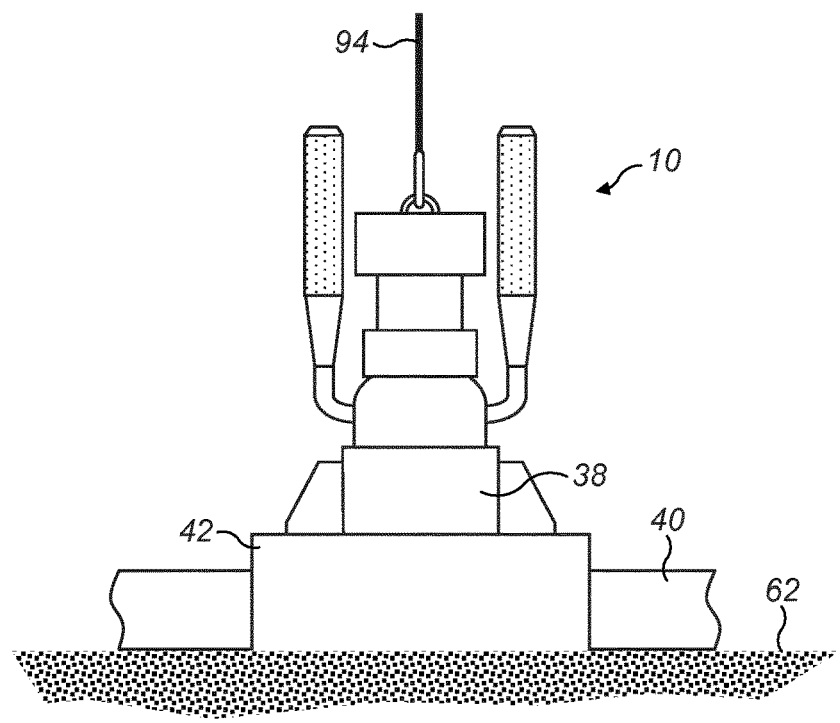
FIG. 11 is a schematic side view of a turbo-generator assembly of the invention mounted atop a pipeline accessory that includes a drainage receptacle, with a lifting wire shown coupled to the turbo-generator assembly.
Figure 12:
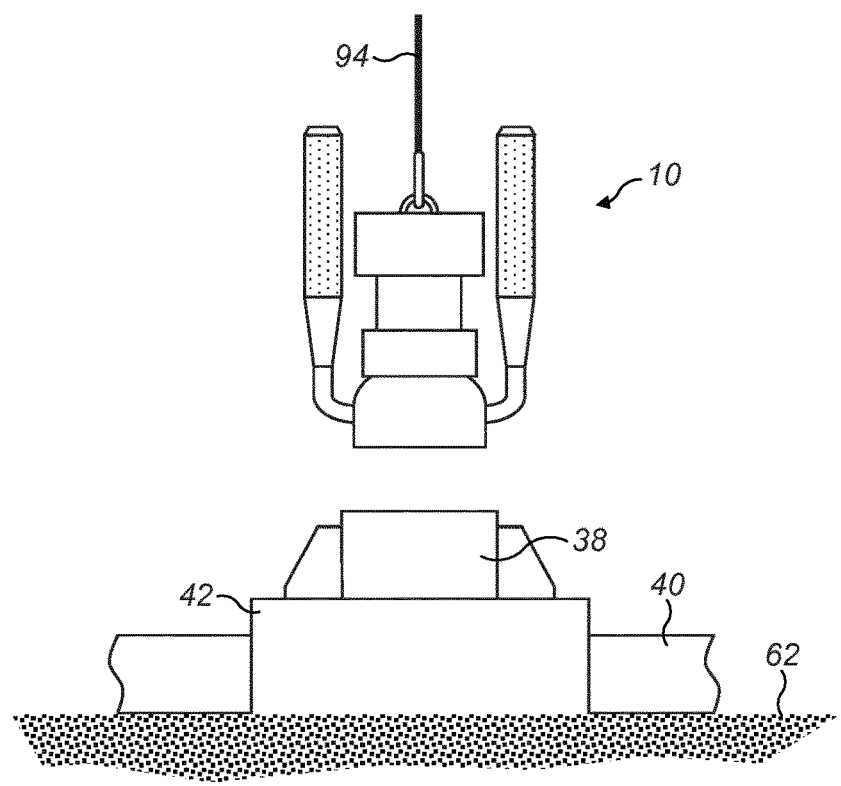
Figure 13:
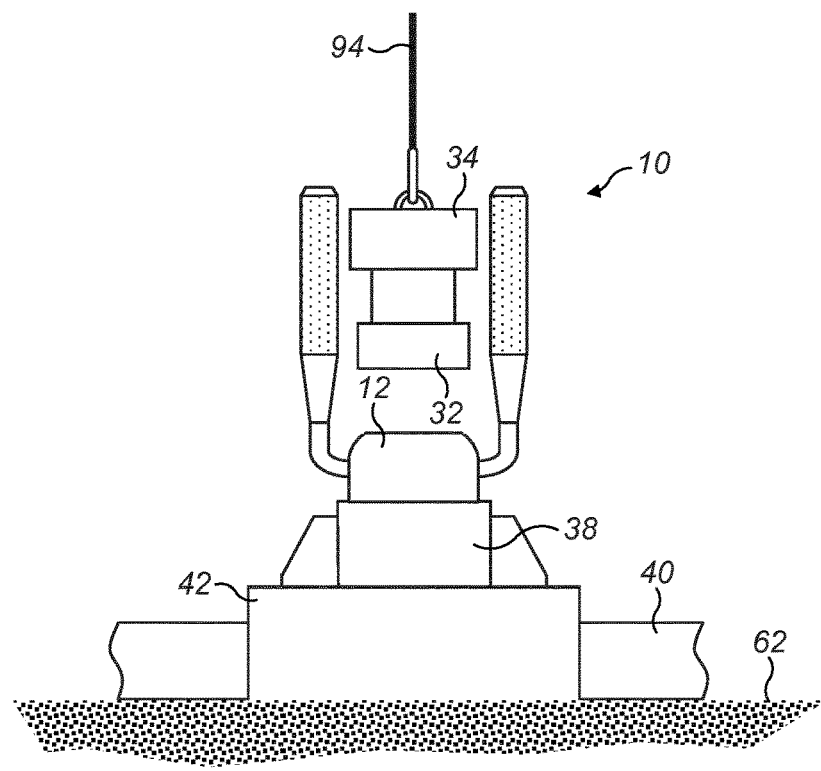
Figure 14:
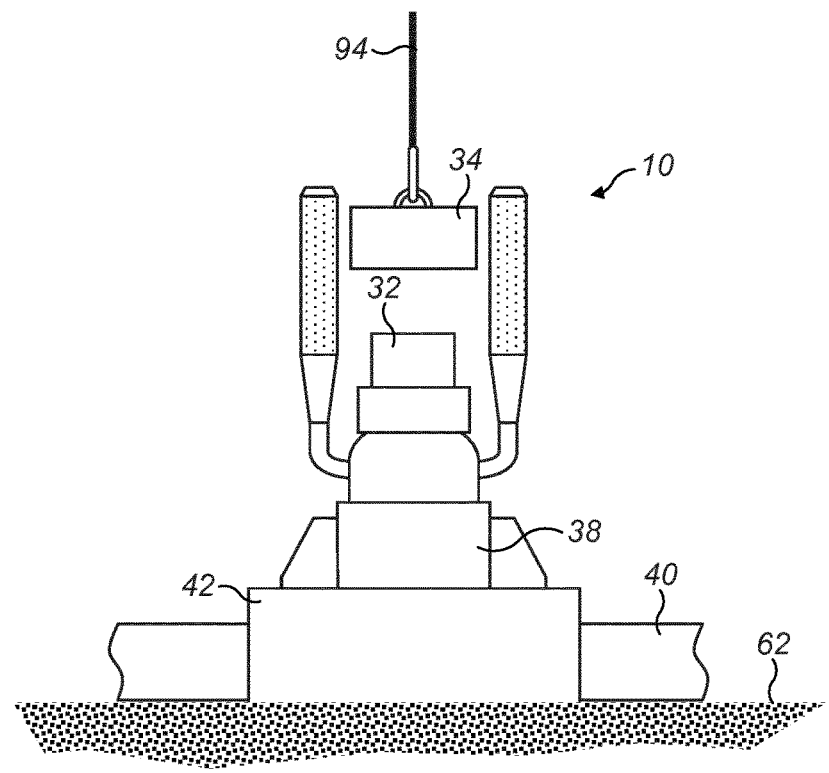
Figure 15:
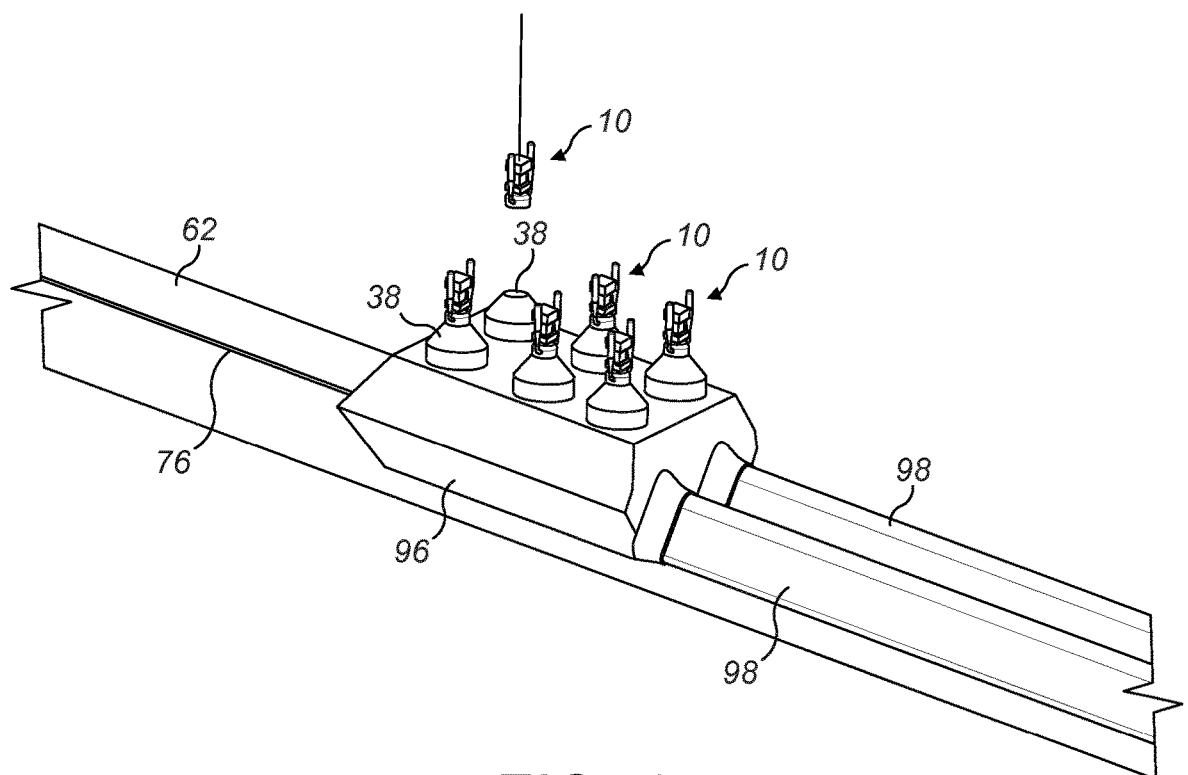
Figure 16:
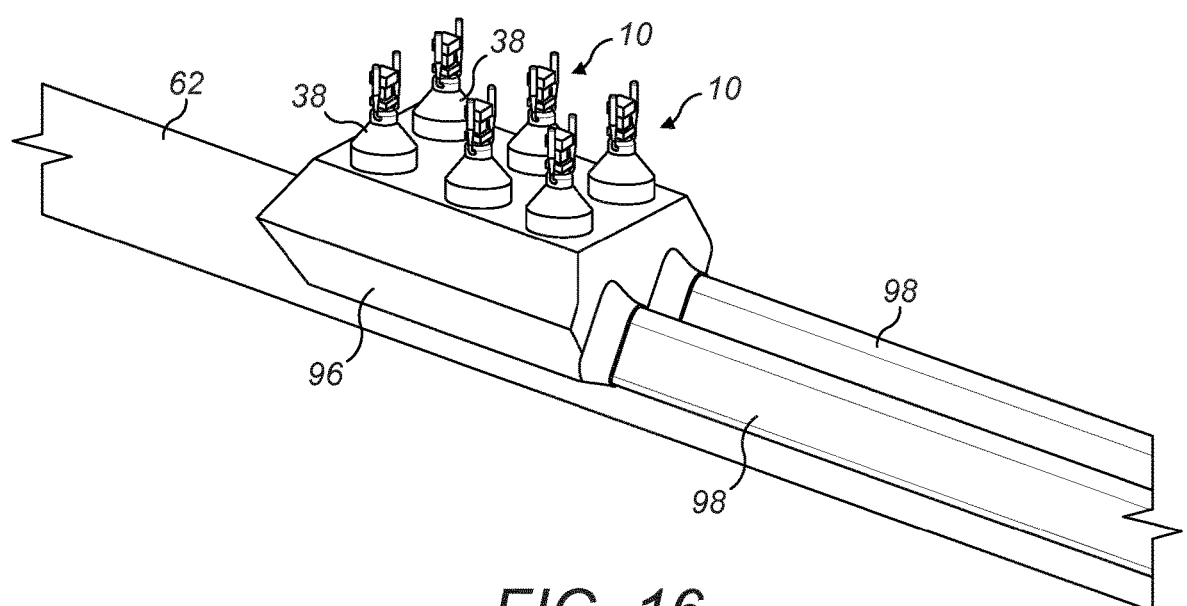
Figure 17:
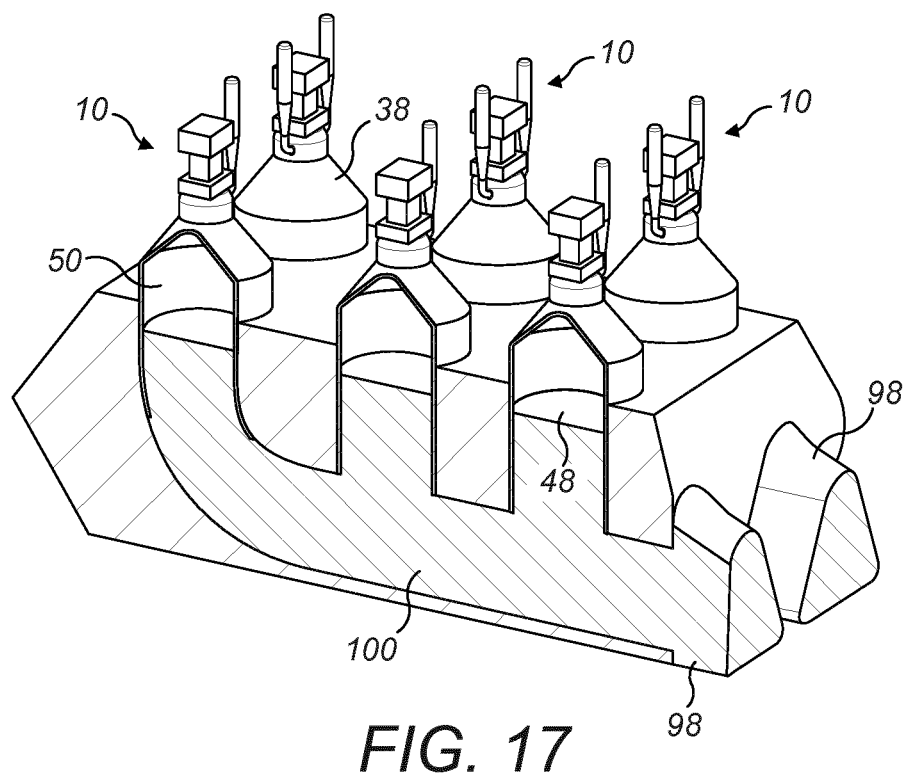
Figure 18:
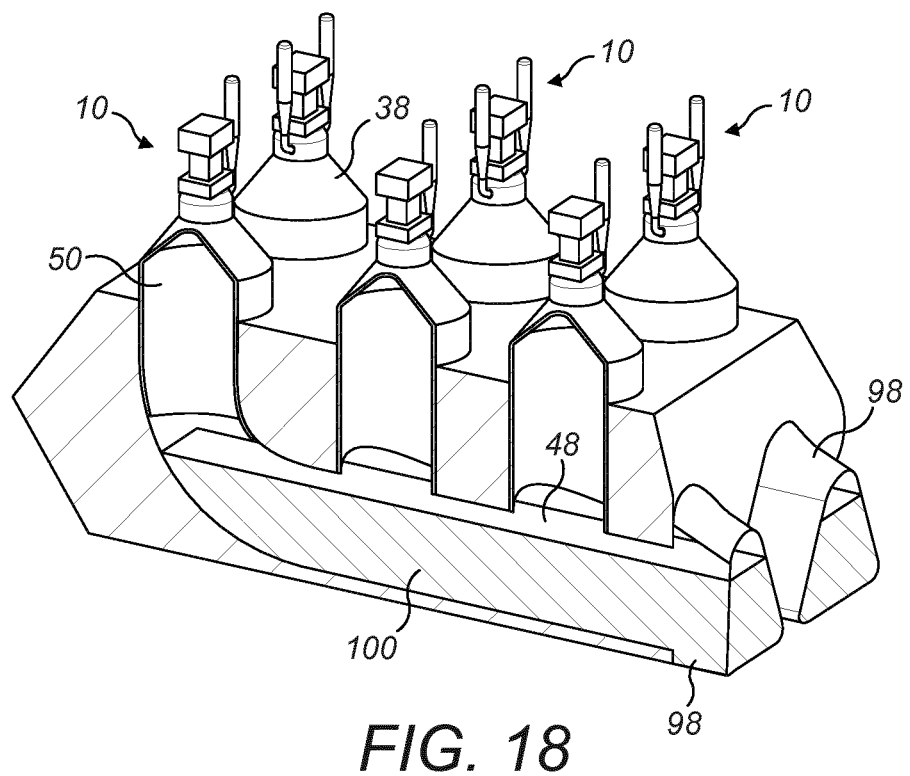

FIG. 12 corresponds to FIG. 11 but shows the turbo-generator assembly being lifted away from the drainage receptacle of the pipeline accessory;

FIG. 13 corresponds to FIG. 11 but shows a generator and transformer unit being lifted away from the remainder of the turbo-generator assembly, which remains attached to the pipeline accessory;

FIG. 14 corresponds to FIG. 11 but shows a transformer unit being lifted away from the remainder of the turbo-generator assembly, which remains attached to the pipeline accessory;

FIG. 15 is a schematic perspective view of a towhead of a pipeline bundle structure pre-installed on the seabed, onto which a turbo-generator assembly is being installed to join other turbo-generator assemblies already installed on the towhead;

FIG. 16 is a schematic perspective view of the towhead of FIG. 15 on which all of the turbo-generator assemblies are now installed;

FIG. 17 is a schematic perspective view of the towhead of FIGS. 15 and 16 in a wholly or partially discharged state; and FIG. 18 is a schematic perspective view corresponding to FIG. 17 but showing the towhead charged with potential energy due to a pressure differential with surrounding seawater.

Referring firstly to FIGS. 1 to 4 of the drawings, a turbo-generator assembly 10 of the invention comprises a hollow, rigid, pressure-resistant and self-supporting domed shell or housing 12. The housing 12 is rotationally symmetrical around a substantially vertical central axis 14 and so is circular in plan view.

The housing 12 contains a generally toroidal manifold or ring duct 16 for high-pressure water that encircles the central axis 14. The housing 12 also encloses, and the duct 16 also surrounds, a Pelton turbine 18 that is supported to spin about the central axis 14. Such a turbine 18 is characterised by an array of circumferentially-facing buckets 20 that are distributed angularly around the central axis 14.

Figure 4:
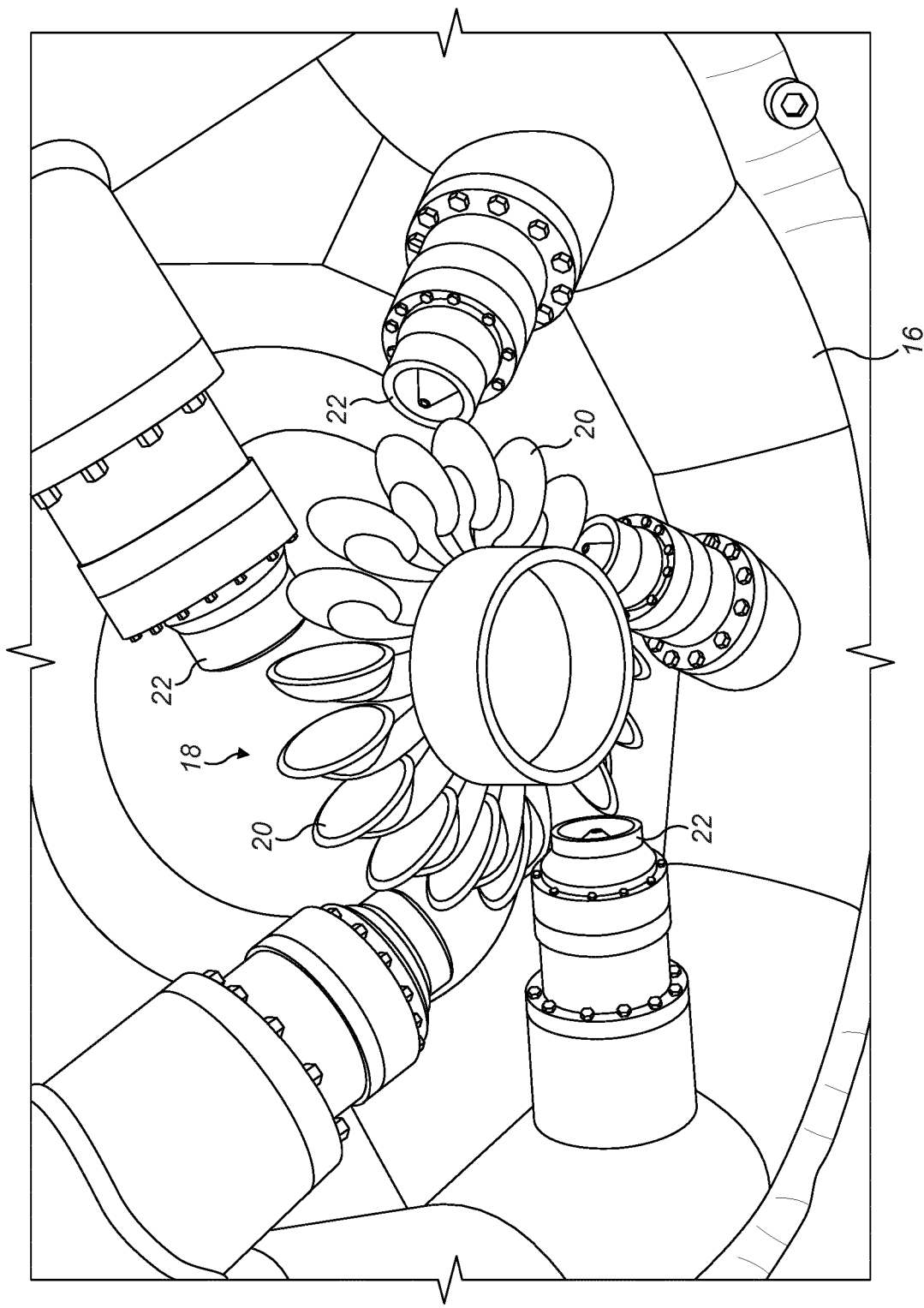
FIG. 4 is a perspective view from underneath of a Pelton turbine and nozzle array that is suitable for use in a turbo-generator assembly of the invention.

As best shown in FIG. 4, the ring duct 16 supports, and is in fluid communication with, an array of nozzles 22 that face inwardly from the ring duct 16 and are spaced angularly from each other around the central axis 14. The nozzles 22 are offset angularly from radial alignment with respect to the central axis 14, all in the same circumferential direction. Thus, the nozzles 22 have tangential orientation to direct jets of high-pressure water from the ring duct 16 into the buckets 20 of the turbine 18 with substantial circumferential or tangential momentum.

The ring duct 16 is also in fluid communication with one or more elongate penstock structures 24, through which the ring duct 16 receives high-pressure water, in use, from the surrounding sea. The or each penstock structure 24 is supported by the assembly 10, in this example by the housing 12 of the assembly 10, but is otherwise self-supporting so as to project from the housing 12 into the surrounding sea.

In this example, there are two penstock structures 24 in mutual and symmetrical opposition about the central axis 14. The penstock structures 24 shown here are largely straight and on parallel, substantially vertical axes parallel to the central axis 14, which is preferred for compactness and ease of installation. Upright orientation also creates a helpful gradient in hydrostatic pressure along the length of each penstock structure 24. However, in principle, each penstock structure 24 could have any suitable shape or orientation.

Each penstock structure 24 is tubular and comprises an enlarged intake portion 26 upstream of a frusto-conical venturi or accelerator portion 28 that tapers in a downstream direction, in this case downwardly. An injector pipe 30 downstream of the accelerator portion 28 curves inwardly toward the central axis 14 to extend through the wall of the housing 12 into fluid communication with the ring duct 16 within the housing 12.

The housing 12 is surmounted by, and supports the weight of, a generator 32, such as an alternator, and a transformer 34. The generator 32 closes an open top of the housing 12 and is coupled to the turbine 18 by a drive shaft 36 that also spins on the central axis 14. The transformer 34 is conveniently mounted on top of the generator 32 as shown in this example. However, the transformer 34 could instead be positioned elsewhere and connected to the generator 32 by cables or other conductors.

Figure 1:
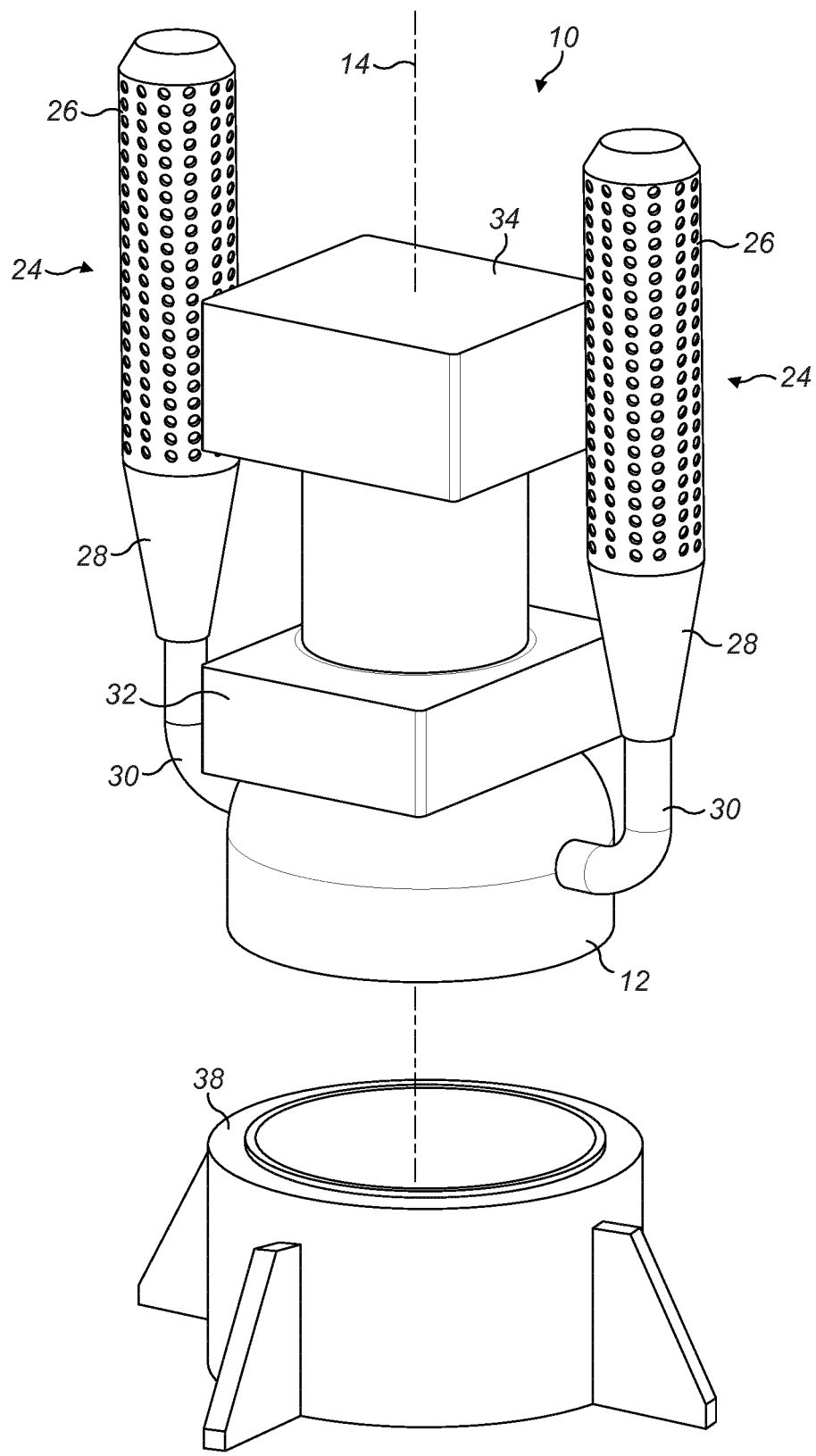
FIG. 1 is an exploded perspective view of a turbo-generator assembly and a drainage receptacle of the invention.
Figure 2:
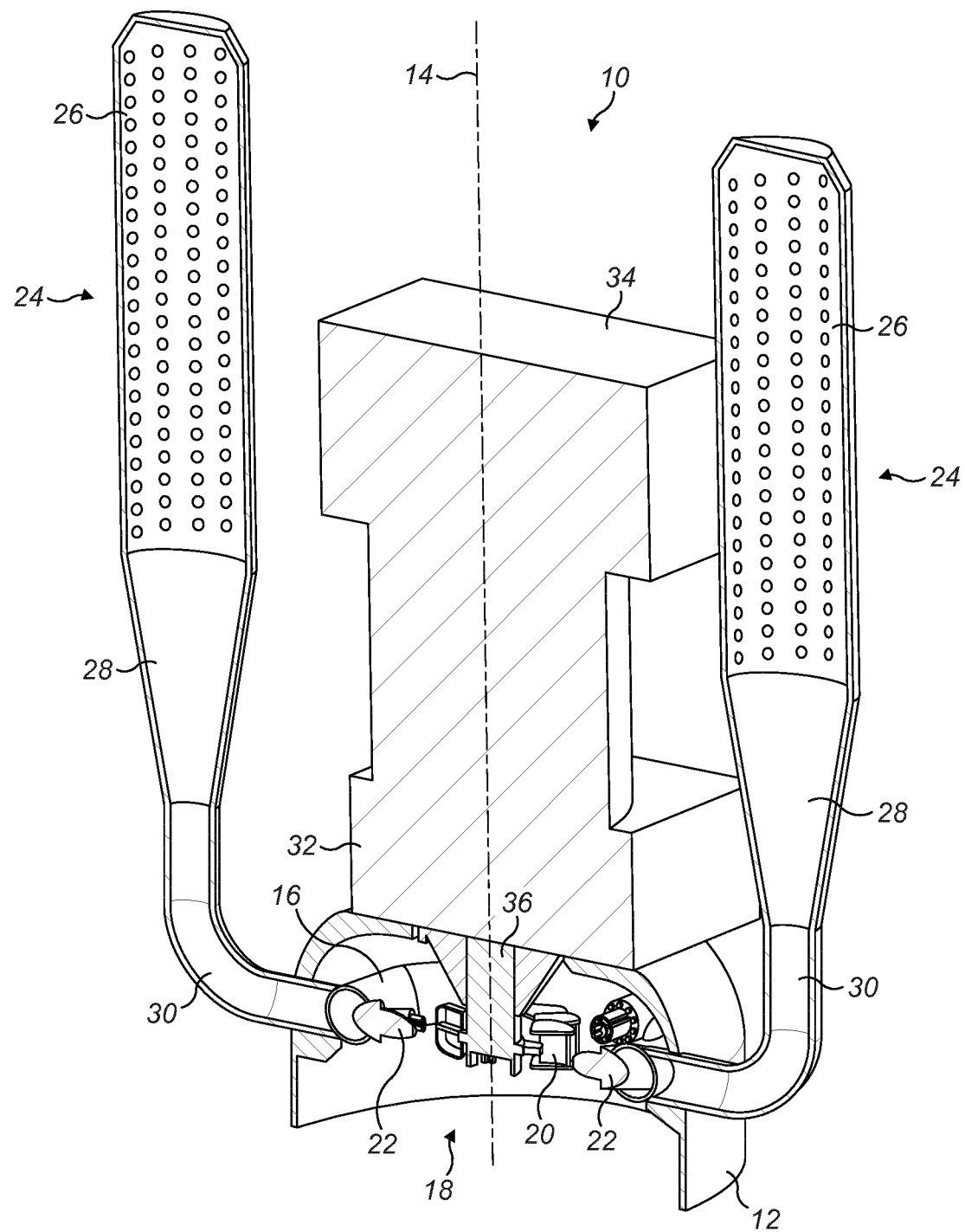
FIG. 2 is a longitudinally-sectioned perspective view of the turbo-generator assembly shown in FIG. 1.
Figure 3:
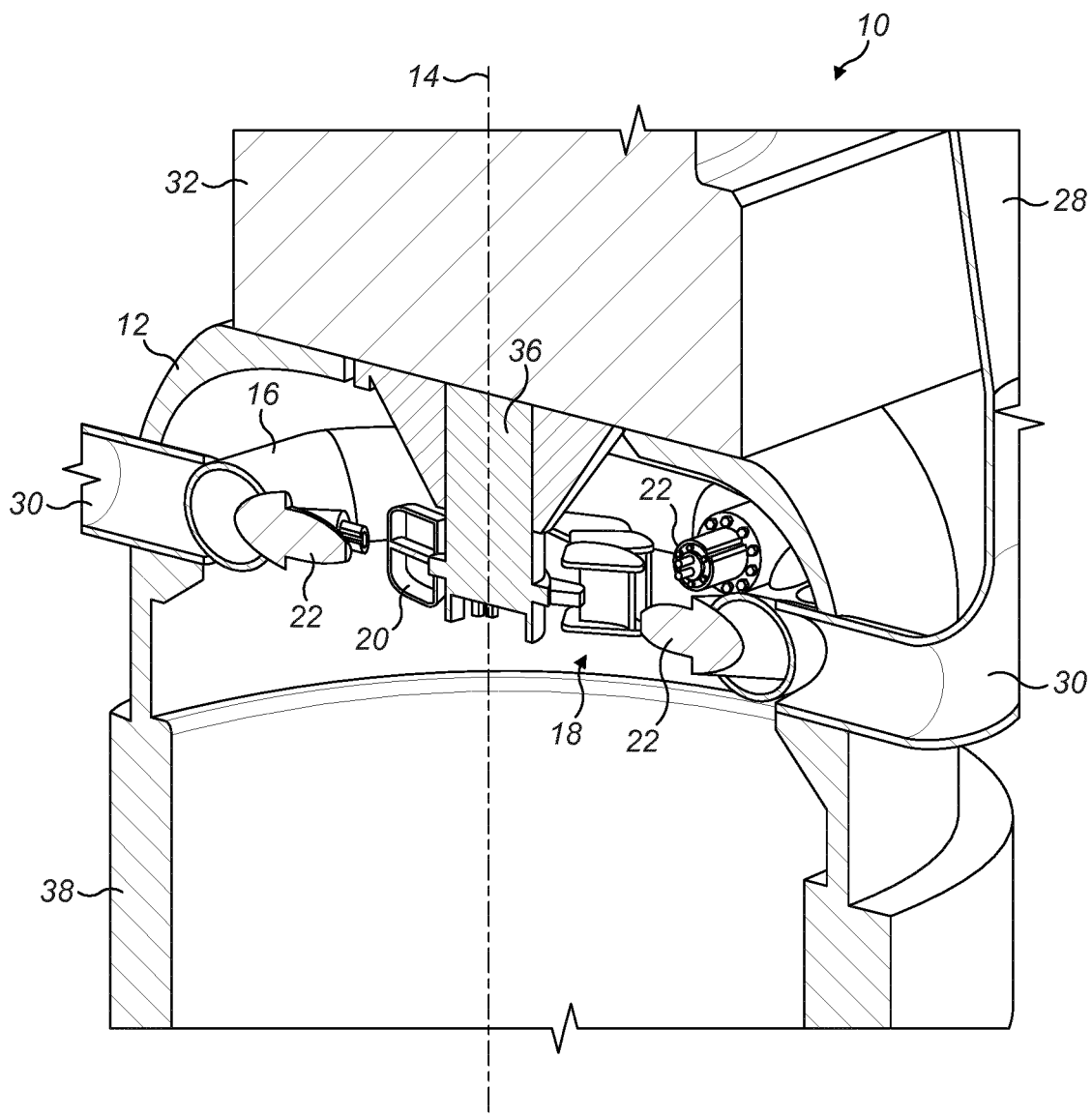
FIG. 3 is an enlarged longitudinally-sectioned detail perspective view of the turbo-generator assembly and the drainage receptacle shown in FIG. 1.

As the internal features of the generator 32 and the transformer 34 are conventional, internal details of them have been omitted from the sectional views of FIGS. 2 and 3. Those sectional views are taken on a plane that extends along the central axis 14.

The housing 12 also has an open bottom that cooperates with and closes the open top of a drainage receptacle 38 that serves as a base or mount for the assembly 10. The drainage receptacle 38 is hollow to define a drainage chamber within a tubular peripheral wall. The bottom of the housing 12 seals against the peripheral wall of the drainage receptacle 38, for example by being seated into an upwardly-facing groove in the peripheral wall to compress a gasket or O-ring placed in the base of the groove.

The drainage receptacle 38 is in fluid communication with a submerged storage volume for holding fluid at a pressure lower than the ambient pressure defined by the hydrostatic pressure of the surrounding seawater. As will be explained, pressure within the storage volume is lowered by pumping out seawater, thus enlarging a gas pocket in a headspace above the reduced volume of seawater that remains in the storage volume. Consequently, a pump is also in fluid communication with the storage volume to create the pressure differential that stores potential energy in the seawater around the storage volume.

Figure 5:
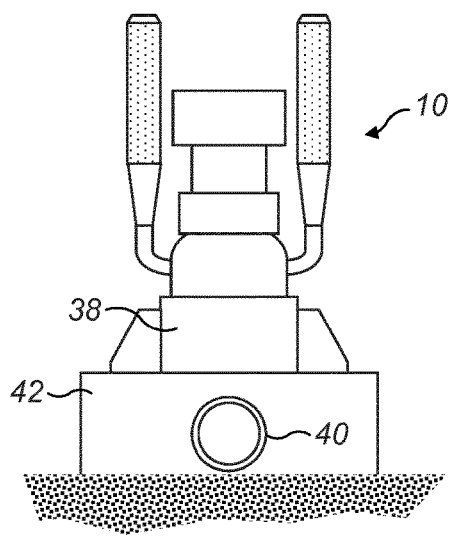
FIG. 5 is a schematic end view of the turbo-generator assembly and drainage receptacle of FIG. 1, mounted atop an accessory of a pipeline that may serve as a storage volume for use with the invention.

In this example, the storage volume is a pipeline 40, meaning that the drainage receptacle 38 may conveniently be attached to, or integrated with, an accessory structure or module 42 of the pipeline 40, atop the module 42 as shown in FIG. 5. Buttresses extend radially from the peripheral wall of the drainage receptacle 38 to the top of the module 42 to brace the assembly 10, which is supported by the tubular wall of the drainage receptacle 38.

Figure 6:
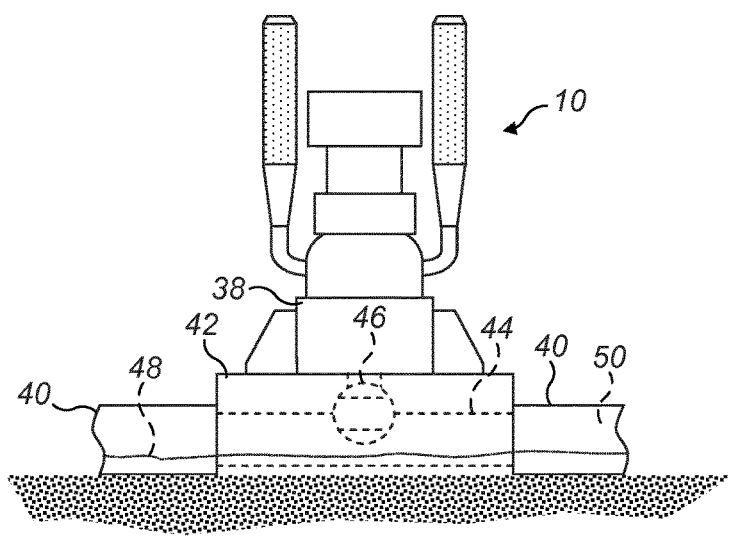
FIG. 6 is a side view corresponding to FIG. 5 and showing the accessory in the form of an in-line module.
Figure 7:
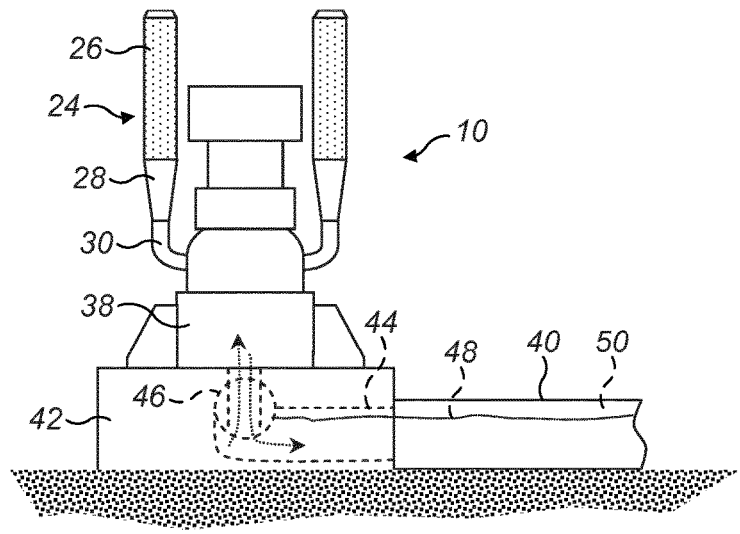
FIG. 7 is a side view corresponding to FIG. 5 and showing the accessory in the form of a terminal module.

FIG. 6 shows the drainage receptacle 38 atop an in-line module 42 at an intermediate location along the length of the pipeline 40 whereas FIG. 7 shows the drainage receptacle 38 atop a terminal module 42 at an end of the pipeline 40. In each case, the module 42 has one or more internal channels 44 that effect fluid communication between the pipeline 40 and the assembly 10 via the drainage receptacle 38. In this example, the or each channel 44 incorporates a valve 46 such as a ball valve that can be closed to close the channel 44 and hence to close and seal the storage volume defined by the pipeline 40.

When the valve 46 is closed as shown in FIG. 6 and a pump in fluid communication with the pipeline 40 is activated to expel seawater from within the pipeline 40, the pipeline 40 holds fluid in the form of gas and water at low pressure. The system is therefore charged with potential energy due to the pressure differential with the surrounding seawater, which remains at high hydrostatic pressure. It will be noted from FIG. 6 that the water level 48 in the pipeline 40 is low and that a headspace 50 of gas such as air and water vapour above the water level 48 in the pipeline 40 is correspondingly large in volume.

When the valve 46 is opened as shown in FIG. 7, seawater surrounding the assembly 10 is drawn into the penstock structure 24 through a perforated wall of the intake portion 26. The perforated wall serves as a filter that blocks entry into the system of potentially damaging debris that could be entrained in the inrushing seawater. Other, or additional, filtering provisions are of course possible.

The accelerator portion 28 accelerates the incoming flow from the intake portion 26, which therefore enters the injector pipe 30 with high velocity. At the interface between the injector pipe 30 and the ring duct 16, the high-velocity water is deflected to follow the duct 16 in a circumferential direction corresponding to that of the jets projected by the nozzles 22. The effect is that a high-pressure, high-velocity water flow impinges against the buckets 20 of the turbine 18 and so drives the turbine 18 efficiently.

A Pelton turbine 18 operates most efficiently when spinning in a gas such as air or water vapour. Consequently, after impinging on the buckets 20 of the turbine 18, water drains or is evacuated from the turbine 18 into the drainage receptacle 38 and from there into the storage volume that is defined by the pipeline 40 in this example.

It will also be apparent that gas trapped in the pipeline 40 or other storage volume will tend to rise into the housing 12 around the turbine 18 and will be trapped there by the domed shape of the housing 12. Gas remains trapped in the system to allow the volume of water in the pipeline 40 to change as pressure in the pipeline 40 is varied. The opposed dotted arrows within the module 42 of FIG. 7 illustrate the upward migration of gas into the housing 12 in exchange for downward flow of water into the pipeline 40.

Figure 8:
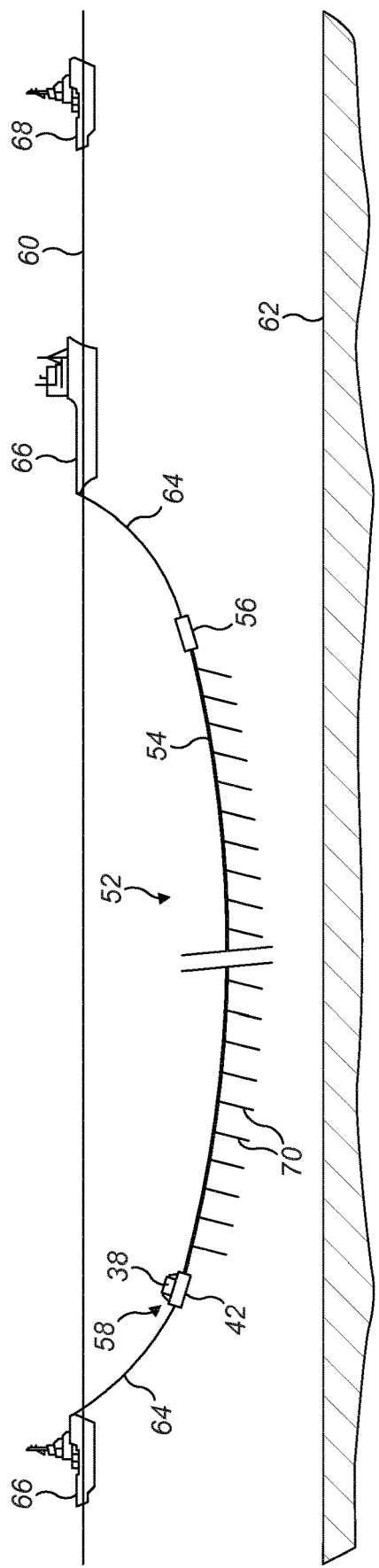
FIG. 8 is a schematic side view of a subsea power plant of the invention comprising a pipeline bundle with towheads arranged respectively for power generation and pumping, shown here being towed to a subsea installation site using the controlled depth towing method known in the art.
Figure 9:
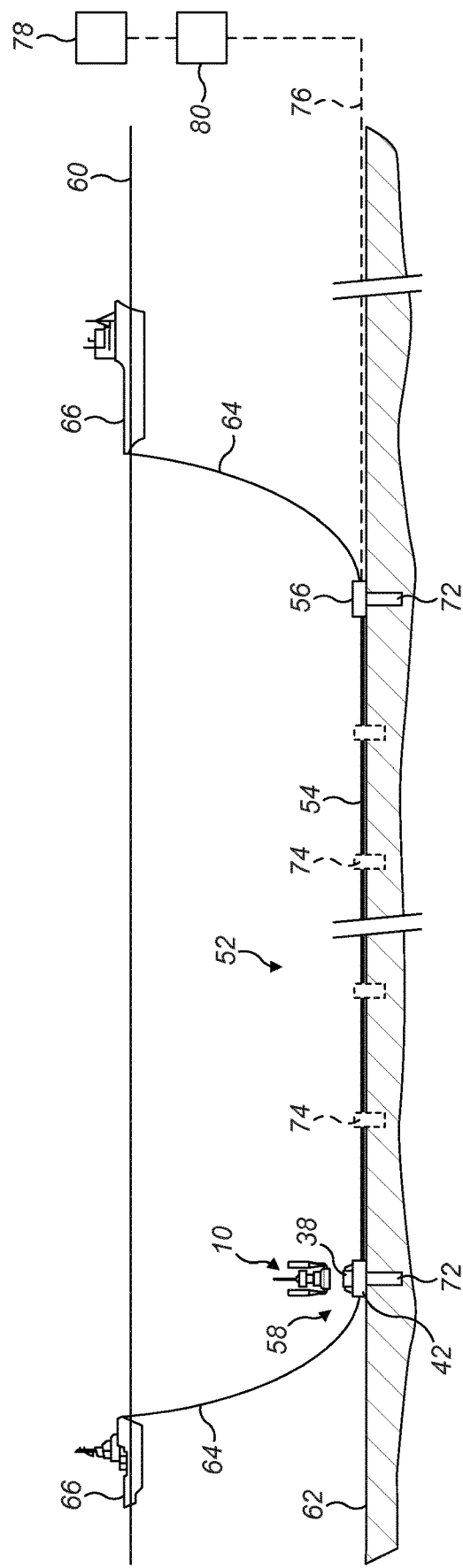
FIG. 9 is a schematic side view of the power plant of FIG. 8 now laid on the seabed and connected to a power grid.
Figure 10:
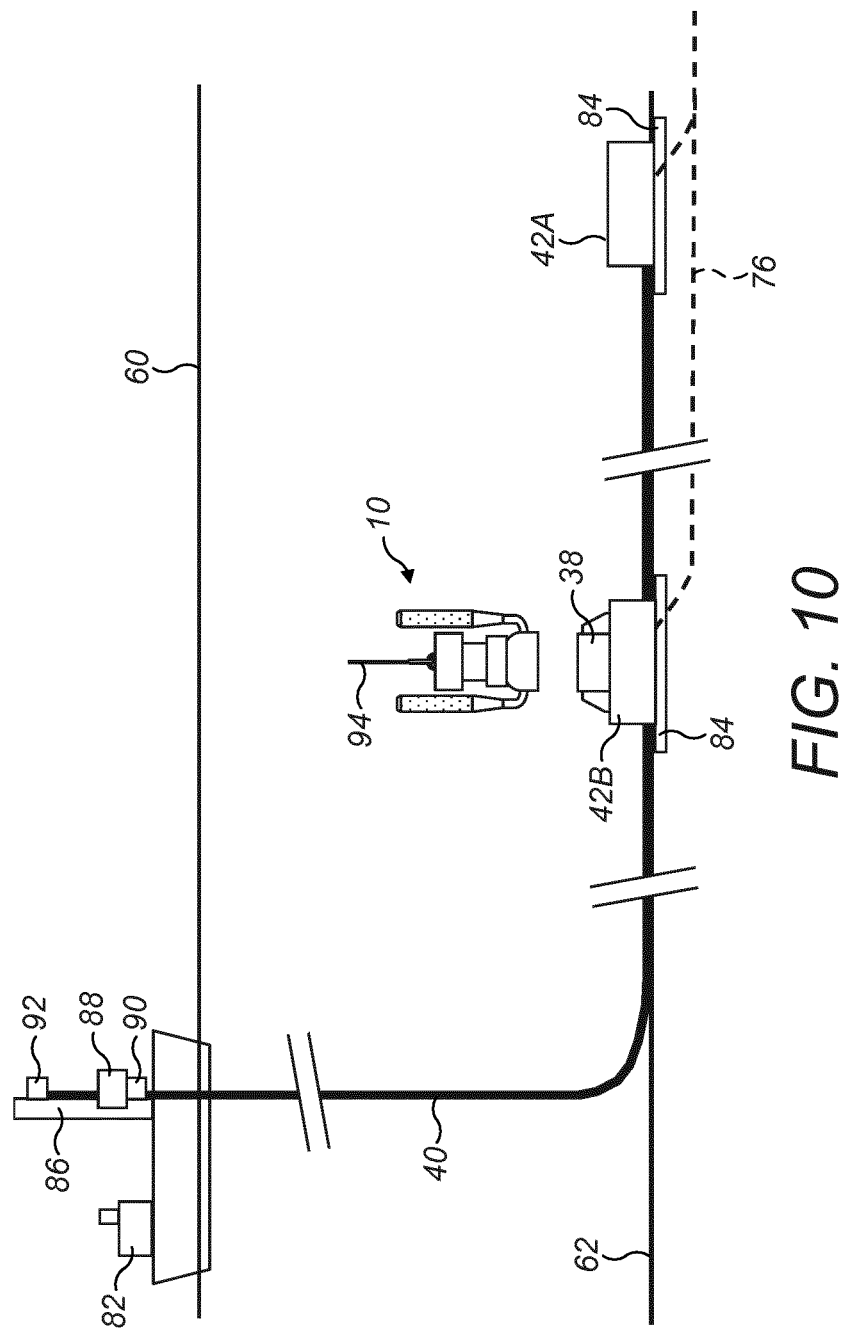
FIG. 10 is a schematic side view of another embodiment of the invention, here showing a J-lay vessel in the process of installing a subsea power plant by laying a pipeline that comprises integrated accessories for power generation and pumping.

Turning next to FIGS. 8 to 10, these drawings show the turbo-generator assembly 10 in the wider context of a subsea power plant that has a pump arranged to expel seawater from an elongate storage volume. They also exemplify ways in which such a power plant may be installed on the seabed.

FIGS. 8 and 9 show a subsea power plant of the invention embodied as a towable bundle unit 52. The unit 52 comprises a pipeline bundle 54 connecting a leading towhead 56 and a trailing towhead 58. The bundle 54 comprises two or more substantially parallel pipes that extend substantially the full length of the bundle 54 between the towheads 56, 58.

The leading towhead 56 contains a pump so that after the unit 52 has been installed, water can be pumped from within the pipes of the bundle 54 into the surrounding sea. The trailing towhead comprises a module 42 and a drainage receptacle 38 onto which the turbo-generator assembly 10 can be docked, for example after the unit 52 has been installed as shown in FIG. 9. Water admitted through the turbine 18 of the turbo-generator assembly 10 under hydrostatic pressure drives the generator 32 of the turbo-generator assembly 10 to produce electricity on demand.

Pipes of the bundle 54 serve as one or more energy storage tanks that can be of any reasonable length, and therefore of any internal capacity that may reasonably be required. Such a bundle unit 52 has proven resistance to hydrostatic pressure and can be fabricated and installed in a single operation using well-known and reliable methods.

As is well known in the art, pipes of the bundle 54 may be surrounded by an external carrier pipe. A carrier pipe and/or the pipes within any carrier pipe may be configured to resist the hydrostatic pressure at the operational depth. Alternatively, exposed pressure-resistant pipes of the bundle 54 may be clustered around a central core pipe or spine. A central core pipe may itself be pressure-resistant to add energy-storage capacity to the bundle 54 or it may remain flooded to act solely as a structural element.

The various pipes of the bundle 54 are typically of steel but any of them could be largely of polymers or of composite materials. Additional layers or components can be added to the pipes, such as an internal liner or an outer coating. Such additional layers or components may comprise polymer, metal or composite materials. Also, pipes can be single-walled or of double-walled pipe-in-pipe (PiP) construction.

Other elongate elements such as auxiliary pipes and cables may be included in the bundle 54, extending in parallel with the other pipes of the bundle 54 in well-known fashion to carry fluids, power and data signals between the towheads 56, 58. As is also conventional, longitudinally-distributed transverse spacers may hold the various pipes and other elongate elements of the bundle 54 relative to each other.

A typical pipeline bundle 54 is a few kilometres in length, for example about 2 km long. Its maximum length may be constrained by the availability of land at onshore fabrication facilities such as spoolbases or yards, However, a pipeline bundle 54 can be made longer by fabricating it from multiple bundle sections coupled end-to-end. In principle, therefore, a bundle 54 assembled from two or more such bundle sections could be of any reasonable length.

Thus, the bundle unit 52 is shown in FIGS. 8 and 9 both interrupted and greatly shortened. Also, the depth of the water between the surface 60 and the seabed 62 will usually be much greater than these schematic views would suggest.

Integrating the bundle 54 and the towheads 56, 58 to form the towable unit 52 allows the unit 52 to be prefabricated, assembled and tested onshore or in sheltered water before it is towed offshore for installation. Conveniently, therefore, multiple elongate elements can be towed together to an installation site as a single integral unit and installed on the seabed simultaneously in one operation. Reducing the number of subsea-connected interfaces simplifies the installation process and improves the reliability of the system, as compared with connecting units at a subsea location and performing tests there instead.

The towheads 56, 58 incorporate buoyancy, or provide for buoyancy to be attached, to offset their weight during towing. For example, buoyancy may be added directly to the towheads 14, 16 by attaching buoys or buoyancy modules to them.

The bundle 54 may also contribute buoyancy to the unit 52 by virtue of air or other gas contained within a sealed carrier pipe. However, as noted above, an external carrier pipe is optional; pipes of the bundle 54 may instead be clustered around a central core pipe or spine. Additional external buoyancy may also be provided on, or attached to, a carrier pipe, a core pipe or other pipes of the bundle 54.

Various towing methods may be used to transport the unit 52 to an offshore installation site. In particular, the unit 52 may be towed at various depths in the water. The choice of towing depth involves a trade-off between various factors. For example, the unit 52 may be surface-towed at or near to the surface 60, which is easiest to manage. However, surface water dynamics may generate fatigue in the pipeline bundle 54, which is a factor that limits the allowable tow distance. Conversely, towing near the seabed 62 protects the bundle 54 from the influence of surface water dynamics and limits risks during subsequent lowering to the seabed 62 at the installation site. However, controlling the unit 52 is more challenging at depth and is only feasible if the contours of the seabed 62 permit.

FIG. 8 shows the preferred option of a mid-water towing method in which the unit 52 is towed at an intermediate depth in the water column between the surface 60 and the seabed 62. Here, the unit 52 is safely clear of the contours of the seabed 62 and is beneath significant influence from wave action near the surface 60. Specifically, FIG. 8 shows a favoured mid-water towing method known in the art as the 'controlled-depth towing method' or CDTM, as described in U.S. Pat. No. 4,363,566.

Mid-water towing is a good compromise that ensures low-stress installation without the use of large crane vessels that depend on low sea states. This makes installation less weather-sensitive and reduces the cost of installation vessels significantly. However, mid-water towing requires precise management of buoyancy.

In all towing methods, the unit 52 is held in tension by chains or lines 64 extending fore and aft from the respective towheads 56, 58 to respective installation vessels such as tugs 66. The bundle 54 acts in tension between the towheads 56, 58 during towing, with tensile loads being borne principally by a carrier pipe or core pipe of the bundle 54.

The speeds of, and spacing between, the tugs 66 are adjusted to keep the unit 52 at the required depth having regard to the effect of drag forces and tension in the lines 64. Optionally, a third patrol/survey vessel 68 ahead of the leading tug 66 surveys the route and monitors the towing operation.

In the CDTM, the bundle 54 is made neutrally or slightly negatively buoyant at the required depth by the addition of buoyancy and/or ballast chains spaced along its length. In the example shown, ballast chains 70 spaced along the bundle 54 add weight that offsets any positive buoyancy of the bundle 54. As a result of the added ballast weight, the bundle 54 hangs between the towheads 56, 58 as a catenary.

When the unit 52 reaches an installation site, the unit 52 is lowered toward the seabed 62 while the lines 64 are paid out from the tugs 66. The unit 52 can be lowered to the seabed 62 by removing external buoyancy from the unit 52 or by adding ballast to the unit 52. The unit 52 then settles on the seabed 62 as shown in FIG. 9, with the bundle 54 resting on and supported by the seabed 62 between the towheads 56, 58.

FIG. 9 shows the towheads 56, 58 landed on and supported by pre-installed foundations 72. The foundations 72 may, for example, be embedded structures such as suction piles or pin piles. Alternatively, all or part of the foundations 72 could be integrated with the towheads 56, 58 or be installed after the towheads 56, 58 have been landed on the seabed 62.

FIG. 9 also shows, in dashed lines, other features that are apt to be installed after the unit 52 has been installed. Specifically, anchors 74 such as staples or pins are spaced along the bundle 54 to fix the bundle 54 to the seabed 62.

Also, a power cable 76 connects the unit 52 to an electrical power grid 78 via a control system 80, both of which may be situated wholly or partially above the surface 18 or on land. In principle, it may instead be possible to connect a power cable 76 to the unit 52 before towing or installing the unit 52.

Like numerals are used for like features in FIG. 10, which exemplifies how a subsea energy storage tank could instead be defined by a pipeline 40 that is launched from an installation vessel 82 on the surface 60. During installation, the pipeline 40 hangs as a catenary from the installation vessel 82 toward the seabed 62. In principle, depending upon its materials and dimensions and the depth of water, the pipeline 40 could be installed by any method for installing subsea pipelines as known in the art, such as reel-lay, S-lay or J-lay. A J-lay operation is shown here, by way of example.

Conveniently, as shown in FIG. 10, the pipeline 40 may include modules 42, any or all of which may comprise or support pumping and power-generation facilities like those of the towheads 56, 58 in FIGS. 8 and 9. As noted above, such modules 42 may be disposed at an end of the pipeline 40 or may be inserted within the length of the pipeline 40. The modules 42 are therefore analogous to well-known pipeline accessories such as in-line tee assemblies (ILTs or ITAs), pipeline end manifolds (PLEMs) and pipeline end terminations (PLETs). Thus, using well-known techniques, the modules 42 may be incorporated into the pipeline 40 as it is launched into the sea.

The modules 42 are exemplified here by a terminal or end module 42A welded to an end of the pipeline 40 and an in-line module 42B welded between neighbouring sections of the pipeline 40 disposed end-to-end. Another terminal or end module 42A will be welded in due course to the other end of the pipeline 40, to close and seal that end of the pipeline 40 on completion. As is conventional, the modules 42 could have mudmat foundations 84 as shown but other foundations such as the aforementioned piles shown in FIG. 9 could be used instead.

The pipeline 40 may be of single-walled construction or could instead be of twin-walled pipe-in-pipe (PiP) construction. Again, the pipeline 40 may be of steel, polymer or composite material and may comprise additional layers or components such as an internal liner or an outer coating. For example, some installation techniques such as S-lay will allow the pipeline 40 to have an outer weight coating of concrete to stabilise it on the seabed 62.

In J-lay operations as shown in FIG. 10, the pipeline 40 is assembled from pipe joints in an upright J-lay tower 86 on an installation vessel 82 offshore. The pipeline 40 hangs near-vertically to a sagbend approaching the seabed 62, thus assuming a J-shape.

Pipe joints are lifted into the tower 86 to be welded to the top of a suspended pipe string. The tower 86 is shown here as being vertical for simplicity but in practice it could be pivoted or gimballed to depart from the vertical. Welding operations are performed at a welding station 88 near the base of the tower 86.

A fixed lower bushing 90 beneath the welding station 88 and a travelling upper bushing or clamp 92 on the tower 86 support the pipe string in alternation. The lower bushing 90 and the travelling clamp 92 cooperate in a 'hand-over-hand' arrangement to lower the pipe string as successive pipe joints are added.

FIG. 10 shows a turbo-generator assembly 10 being docked with the module 42B after that module 42B has been landed on the seabed 62. The assembly 10 is suspended from a lifting wire 94 that hangs from a winch or crane of a vessel, not shown, on the surface 60.

After the pipeline 40 has been installed, a power cable 76 extends from the modules 42A, 42B, for example to connect them to an electrical power grid via a control system as shown in FIGS. 8 and 9. Again, anchors such as staples or pins could be spaced along the pipeline 40 to fix the pipeline 40 to the seabed 62, but such anchors are not shown in FIG. 10.

Stacking major components of the assembly 10 along the vertical central axis 14 simplifies installation and maintenance, allowing the assembly 10 as a whole, or any of its major components, to be lowered from or raised to the surface together or separately. Subsea-releasable, ROV-operable fastenings may be provided between the stacked components for this purpose. In this respect, reference is made to FIGS. 11 to 14.

FIG. 11 shows the assembly 10 mounted atop an in-line module 42 of a pipeline 40 via the drainage receptacle 38. A lifting wire 94 is attached centrally to the top of the assembly 10. FIG. 12 shows the assembly 10 now suspended from the lifting wire 94 and being lifted off, or lowered onto, the drainage receptacle 38, which remains attached to the module 42.

The assembly 10 may also be assembled or disassembled subsea. For example, FIG. 13 shows the generator 32 and transformer 34 of the assembly 10 being lifted off, or lowered onto, the housing 12 of the assembly 10, which remains attached to the module 42 via the drainage receptacle 38. Conversely, FIG. 14 shows the transformer 34 being lifted off, or lowered onto, the generator 32, which remains attached to the module 42 via the housing 12 and the drainage receptacle 38.

Finally, FIGS. 15 to 18 show another embodiment of the invention in which multiple turbo-generator assemblies 10 are grouped together on a towhead 96.

The towhead 96 has integral drainage receptacles 38 on its upper horizontal face, onto which the turbo-generator assemblies 10 can be mounted. The towhead 96 is at an end of an elongate storage volume, which is defined by a parallel pair of pipeline bundles 98 in this example. Valves to control incoming fluid flow and hence power generation are not shown in these simplified drawings but could be incorporated at any suitable location in the flowpath, upstream and/or downstream of the turbines in the turbo-generator assemblies 10.

As can be appreciated in the sectional views of FIGS. 17 and 18, the pipeline bundles 98 are in fluid communication with the turbo-generator assemblies 10 through branched manifold channels 100 in the towhead 96. Specifically, the turbo-generator assemblies 10 and their associated drainage receptacles 38 are in parallel longitudinal rows on the towhead 96. Each pipeline bundle 98 is in fluid communication with a respective row of turbo-generator assemblies 10 through a respective manifold channel 100.

It would of course be possible for the pipeline bundles 98 to communicate with each other and with all of the turbo-generator assemblies 10. Valves may be provided to segregate the pipeline bundles 98 and the turbo-generator assemblies 10 from each other to isolate failures and to facilitate maintenance or replacement of components.

FIG. 15 shows five turbo-generator assemblies 10 already installed on respective drainage receptacles 38 of the towhead 96 pre-installed on the seabed 62. A sixth turbo-generator assembly 10 is shown being lowered onto the open top of a sixth drainage receptacle 38 of the towhead 96.

FIG. 16 shows all of the turbo-generator assemblies 10 in place on top of the towhead 96.

FIG. 17 shows the system in a wholly or partially discharged state. Consequently, the water level 48 in the towhead 96 and the pipeline bundles 98 is high and the headspace 50 of gas above the water level 48 is correspondingly small in volume. The headspace 50 is divided into multiple gas pockets, one for each of the turbo-generator assemblies 10, corresponding to the branches of the manifold channels 100.

FIG. 18 shows the system charged with potential energy due to a pressure differential with the surrounding seawater. The water level 48 in the towhead 96 and the pipeline bundles 98 is therefore low and the headspace 50 is correspondingly large in volume. The headspace 50 now extends between all of the turbo-generator assemblies 10.

Many other variations are possible within the inventive concept. For example, the drainage receptacle 38 could be integrated with or recessed into the storage volume or with or into any structure, such as a pipeline accessory module 42, that communicates fluidly with a storage volume such as the pipeline 40. A drainage receptacle 38, as a distinct structure, could therefore be omitted.

The or each penstock structure 24 could be provided with one or more valves that are capable of controlling or blocking fluid flow. For example, one-way valves may admit inrushing water but block the egress of gas. Valves in the or each penstock structure 24 may be provided instead of, or in addition to, any valve between the assembly 10 and the storage volume, such as the valve 46 described above.

Whilst it is preferred for the storage volume to comprise a pipeline or pipe bundle, the storage volume need not necessarily be an elongate structure. The storage volume could instead take other suitable pressure-resistant shapes such as spherical, part-spherical, ellipsoid or dome-shaped. Also, the storage volume need not be a wholly manufactured structure but could instead include a natural formation such as a subterranean chamber or a subsea well that has been depleted of hydrocarbons or is otherwise no longer economic to exploit.

A Pelton turbine 18 is preferred for its compactness and efficiency. However, in a broad sense, the turbine could be a reversible turbine such as a Francis turbine. In that case, the generator 32 could serve as a motor to spin the turbine in reverse, thereby to expel water from the storage volume along the penstock structures 24 and out into the surrounding sea. This may make it unnecessary to provide a separate pump to evacuate the storage volume.

The apparatus of the invention can be used underwater at any location where it may be submerged at substantial depth in a body or expanse of water. References in this specification to the sea are therefore intended to encompass or exemplify use of the invention in other suitably deep bodies of water, for example lakes.

The invention claimed is:

1. A turbo-generator assembly for producing electrical power underwater, the assembly comprising:
    a pressure-resistant shell that defines a sealed internal chamber and is arranged to maintain a gas-filled space within the chamber;
    at least one water inlet extending through the shell to effect fluid communication between the chamber and a body of water surrounding the shell;
    a Pelton turbine supported within the chamber to turn in the gas-filled space on a spin axis in response to admission of a flow of water into the chamber via the at least one water inlet; and
    a drainage receptacle that communicates with the chamber to receive water falling from the turbine, wherein the drainage receptacle is attached to or integrated with an accessory module of a pipeline or with a towhead module of a pipeline bundle, and wherein the shell is separably mountable and sealable to the drainage receptacle;
    wherein the assembly is installed on a seabed or the body of water, the spin axis of the turn being generally perpendicular to the seabed;
    wherein the at least one water inlet communicates with at least one tubular penstock structure via at least one injector pipe, the injector protruding outward from the shell into the body of water and extending upward toward a surface of the body of water in a direction perpendicular to the seabed,
    the penstock structure comprising a tabular body extending outside the shell in the perpendicular direction, the penstock structure comprising an intake portion perforated with a plurality of openings to accept and filter an incoming flow of water from the body of water,
    the penstock structure further comprising a tapering accelerator portion disposed between the intake portion and the injector pipe.

2. The assembly of claim 1, wherein the at least one penstock structure is supported by the assembly.

3. The assembly of claim 1, wherein the chamber further contains a ring duct that communicates with the at least one water inlet and with a circumferential array of nozzles that surrounds the turbine.

4. The assembly of claim 1, wherein the shell comprises a domed portion around the turbine.

5. The assembly of claim 1, further comprising a generator supported by the shell, the generator configured to generate the electrical power when rotated by the turbine.

6. The assembly of claim 1, further comprising a transformer supported by the assembly.

7. The assembly of claim 6, wherein the spin axis intersects the transformer.

8. The assembly of claim 1, wherein the drainage receptacle has an outlet for fluid communication with a fluid storage volume.

9. A power plant for producing electrical power underwater, the power plant comprising the turbo-generator assembly of claim 1, the internal chamber of the turbo-generator assembly being in fluid communication with a fluid storage volume that is capable of holding fluid at a pressure below a hydrostatic pressure of the body of water surrounding the shell of the turbo-generator assembly.

10. The power plant of claim 9, wherein the internal chamber of the turbo-generator assembly is positioned above the fluid storage volume.

11. The power plant of claim 9, further comprising at least one pump that is in fluid communication with the fluid storage volume and is arranged to expel water from the fluid storage volume.

12. The power plant of claim 9, wherein the fluid storage volume comprises the pipeline or the pipeline bundle.

13. The power plant of claim 12, wherein the turbo-generator assembly is supported by the pipeline accessory module or by the bundle towhead module.

* * * * *